United States Patent [19]

Wright et al.

[11] 4,167,272

[45] Sep. 11, 1979

[54] MOUNTING STRUCTURE FOR A RUNNING BOARD

[75] Inventors: Harold G. Wright; Ronald D. Silbaugh, both of Scranton, Iowa

[73] Assignee: Scranton Manufacturing, Scranton, Iowa

[21] Appl. No.: 928,267

[22] Filed: Jul. 26, 1978

[51] Int. Cl.² ............................................. B62B 9/16
[52] U.S. Cl. .................................................. 280/163
[58] Field of Search ............... 280/153 R, 152 R, 163, 280/154, 164, 154.5 R; 296/28 C

[56] References Cited

U.S. PATENT DOCUMENTS

| | | | |
|---|---|---|---|
| 1,266,938 | 5/1918 | Hassler | 280/163 |
| 1,809,711 | 6/1931 | Kile | 280/154.5 R |
| 1,905,895 | 4/1933 | Bronson | 280/163 |
| 2,158,813 | 5/1939 | Altmyer | 280/153 R |
| 3,684,311 | 8/1972 | Pierce | 280/163 |
| 4,021,055 | 3/1977 | Okland | 280/153 R |

*Primary Examiner*—Robert R. Song
*Attorney, Agent, or Firm*—Henderson & Sturm

[57] ABSTRACT

A mounting structure for running boards including a swivel bearing or universal joint disposed between the running board and the frame of the vehicle. The mounting structure is adapted to allow the running board, which is rigidly mounted to the cab, to move with the cab and independent of the frame thereby minimizing the stress on the mounting structure.

8 Claims, 4 Drawing Figures

MOUNTING STRUCTURE FOR A RUNNING BOARD

BACKGROUND OF THE INVENTION

The present invention relates generally to structures for mounting running boards to a vehicle and more particularly to a mounting structure that includes a universal joint or swivel coupling disposed between the running board and the frame of the vehicle.

Some pickup trucks, particularly recent models, have the truck cab movable independent of the vehicle frame. A rubber cushion or similiar device is interposed between the cab and frame of the vehicle to allow for this independent movement. Typical running boards attached to the cab have a bracket or brace member connecting the running board to the frame of the vehicle to give the running board adequate support. Such brackets or braces, however, are rigid and the independent movement of the cab and the frame places tremendous stress on the mounting structure.

Those concerned with this problem have seen the need for an improved mounting structure that will provide adequate support for the running board while at the same time providing a structure that will be sufficiently flexible to minimize the stress resulting from the independent movement of the cab and the frame.

SUMMARY OF THE INVENTION

The mounting structure of the present invention includes a universal coupling interposed between the running board and the frame of the vehicle to allow limited movement of the mounting structure in all directions.

An object of the present invention is the provision of an improved mounting structure for running boards.

Another object is to provide a mounting structure for running boards that is designed such that it will be subjected to minimum stress.

A further object of the invention is the provision of a mounting structure for running boards that is simple in design and easy to maintain.

Other objects, advantages, and novel features of the present invention will become apparent from the following detailed description of the invention when considered in conjunction with the accompanying drawings.

DESCRIPTION OF THE PREFERRED EMBODIMENT

Figure 1:
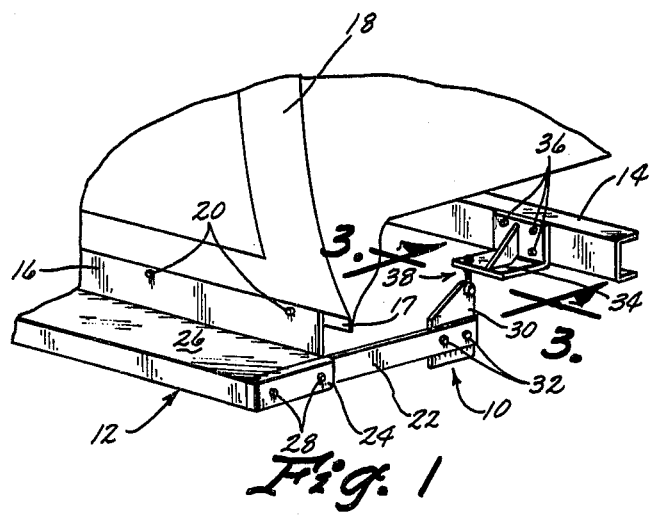
FIG. 1 is a cut away perspective view showing the mounting structure connecting the running board to the frame of a vehicle.

Referring now to the drawings, wherein like reference numerals designate identified or corresponding parts throughout the several views, FIG. 1 shows the mounting structure 10 connecting a running board 12 to the frame 14 of a vehicle. The back plate 16 of the running board 12 is rigidly attached to the body flange 17 of cab 18 by bolts 20.

An elongated step mount bracket 22 together with bump pad 24 is attached to the rearward end of step 26 by bolts 28. The mount bracket 22 extends inwardly toward the frame 14 and is connected to hanger plate 30 by bolts 32. An L-shaped frame mount bracket 34 is attached to frame 14 by bolts 36 and the horizontal portion thereof extends above hanger plate 30. A swivel bearing or universal coupling 38 connects the hanger plate 30 and bracket 34. It is understood that the upper portion of the swivel bearing 38 may be connected directly to the frame 14 on some vehicles without the need of bracket 34.

Figure 2:
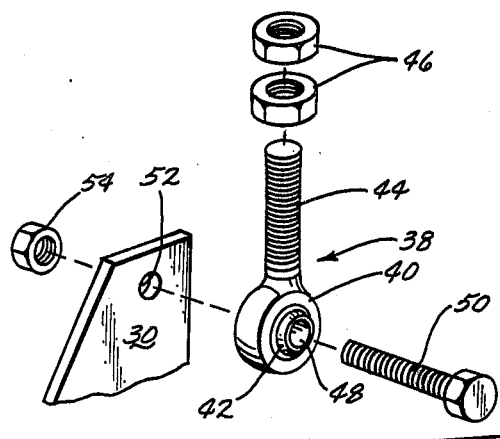
FIG. 2 is an exploded view of the swivel bearing or universal joint which allows limited movement of the mounting structure in all directions.

As seen most clearly in FIG. 2, the universal coupling 38 includes a socket 40 having a ball 42 journaled therein. The socket 40 has a threaded protrusion 44 extending radially outward from socket 40 for attachment to bracket 34 or directly to frame 14 by jam nuts 46. The ball 42 has a cylindrical bore 48 therethrough to accomodate bolt 50. When assembled, bolt 50 also extends through hole 52 in hanger plate 30 and is securred by nut 54.

Figure 3:
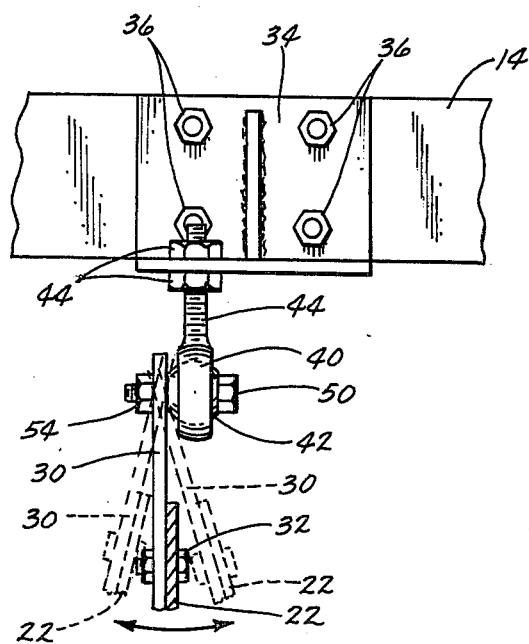
FIG. 3 is a sectional view taken along line 3—3 of FIG. 1, showing the range of movement longitudinal to the vehicle frame.
Figure 4:
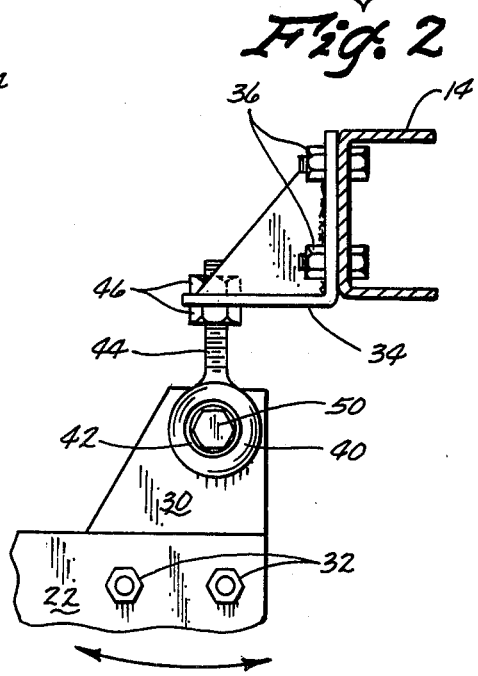
FIG. 4 is a sectional view showing the range of movement transverse to the vehicle frame.

FIG. 3 shows the range of movement of mounting structure 10 in the direction of travel of the vehicle, while FIG. 4 illustrates the movement of mounting structure 10 transverse to the direction of travel of the vehicle. Ball 42 is free to rotate in any direction making the mounting structure 10 highly flexible and allowing the running board 12 to move with the cab 18 and independent of the frame 14.

In installing the running board 12 and mounting structure 10, the back plate 16 is first attached to the body flange 17. The mounting bracket 22 and bump pad 24 is then attached to the rearward end of step 26. If a frame mount bracket 34 is required, it is attached to the frame 14. The universal coupling 38 is then attached to the frame mount bracket 34 or to the frame 14 by jam nuts 46 as shown in FIGS. 3 and 4. The hanger plate 30 is then attached to the universal coupling 38 by bolt 50 and nut 54. Adjustments are made to level the running board 12 and the mounting bracket 22 is then clamped to hanger plate 30, holes are drilled, and bolts 32 are inserted.

Thus it can be seen that a unique mounting structure 10 has been provided which includes a universal coupling 38. This allows the running board 12 high flexibility in moving independent of the frame 14 and thus minimizes stress on the mounting structure.

Obviously many modifications and variations of the present invention are possible in light of the above teachings. It is therefore to be understood that, within the scope of the appended claims, the invention may be practiced otherwise than as specifically described.

We claim:

1. A mounting structure for attaching a running board to a vehicle having a cap and a frame moveable independent of each other, said mounting structure comprising:
   means for attaching said running board to said cab;
   a mounting bracket attached to said running board and extending inwardly thereof toward to said frame; and
   a universal coupling connecting said mounting bracket to said frame, said coupling permitting a swing of limited angle in any direction, whereby the running board is allowed to move with the cab and independent of the frame thereby minimizing stress on the mounting structure.

2. The mounting structure of claim 1 wherein said coupling includes:
   a socket; and
   a ball journaled in said socket.

3. The mounting structure of claim 2 wherein said coupling further comprises:
   a protrusion extending radially outward from said socket, said protrusion being attached to said frame; and
   a protrusion extending outwardly from said ball, said protrusion being attached to said mounting bracket.

4. The mounting structure of claim 2 wherein said coupling includes:
   a cylindrical bore extending through said ball; and
   a pin extending through said bore, said pin being attached to said mounting bracket.

5. The mounting structure of claim 3 wherein the protrusion extending from said socket is threaded and wherein the protrusion is attached to said frame by counter-opposing jam nuts.

6. The mounting structure of claim 4 wherein said pin includes a threaded bolt attached to said mounting bracket by means of a nut.

7. The mounting structure of claim 5 wherein said protrusion is attached to an L-shaped frame mount bracket attached to the vertical side of said frame.

8. The mounting structure of claim 6 wherein said mounting bracket includes:
   an elongated strap attached at one end to said running board; and
   a hanger plate attached to the opposite end of said strap, said hanger plate having an opening therethrough to receive said bolt.

* * * * *